United States Patent
Horng et al.

(10) Patent No.: US 7,729,447 B2
(45) Date of Patent: Jun. 1, 2010

(54) INTERLEAVER DESIGN WITH MULTIPLE ENCODERS FOR MORE THAN TWO TRANSMIT ANTENNAS IN HIGH THROUGHPUT WLAN COMMUNICATION SYSTEMS

(75) Inventors: Jyh Chau Horng, Saratoga, CA (US); Xuemei Ouyang, San Jose, CA (US); Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 820 days.

(21) Appl. No.: 11/317,409

(22) Filed: Dec. 22, 2005

(65) Prior Publication Data

US 2007/0147521 A1 Jun. 28, 2007

(51) Int. Cl.
*H04L 27/00* (2006.01)

(52) U.S. Cl. .................. 375/299; 375/260; 375/267; 375/347; 375/286; 714/752; 714/755; 370/328; 370/208

(58) Field of Classification Search .................. 375/260, 375/267, 299, 347, 286; 700/53; 714/752, 714/755; 370/328, 208
See application file for complete search history.

(56) References Cited

U.S. PATENT DOCUMENTS

| | | | |
|---|---|---|---|
| 4,394,642 A | 7/1983 | Currie et al. |
| 5,745,528 A | 4/1998 | Fimoff et al. |
| 5,987,070 A | 11/1999 | Fimoff et al. |
| 6,775,335 B2 | 8/2004 | Sommer et al. |
| 6,901,550 B2 | 5/2005 | Adar et al. |
| 6,961,388 B2 | 11/2005 | Ling et al. |
| 7,010,053 B2 | 3/2006 | El-Gamal et al. |
| 7,127,658 B2 | 10/2006 | Cucchi et al. |
| 7,154,936 B2 | 12/2006 | Bjerke et al. |
| 7,284,185 B2 | 10/2007 | Chen |
| 7,366,249 B2 | 4/2008 | Gresset et al. |
| 7,523,377 B2 | 4/2009 | Halter |
| 7,542,410 B2 | 6/2009 | Berkovich |
| 2005/0220110 A1 | 10/2005 | Agarwal |
| 2005/0256821 A1 | 11/2005 | Mishra et al. |
| 2005/0265469 A1 | 12/2005 | Aldana et al. |
| 2005/0283705 A1 | 12/2005 | McNamara |
| 2006/0002486 A1 | 1/2006 | van Nee |

(Continued)

OTHER PUBLICATIONS

Mujtaba, S., "TGn Sync Proposal Technical Specification", Jul. 2005, IEEE 802.11-04/0889r7.*

(Continued)

*Primary Examiner*—Mohammad H Ghayour
*Assistant Examiner*—Sung Ahn
(74) *Attorney, Agent, or Firm*—Kenneth L. Sherman, Esq.; Michael Zarrabian, Esq.; Myers Andras Sherman LLP

(57) ABSTRACT

A MIMO communication system implements an interleaver design with multiple encoders for more than two transmit antennas for high throughput WLAN communication systems. Multiple encoders are utilized in the transmitter and multiple decoders are utilized in the receiver, wherein each encoder operates at lower clock speed than would be necessary with a single encoder. In conjunction with using multiple encoders, a modified interleaving function for each spatial stream processing allows fully exploring the diversity gains. The provided interleaving function is suitable for transmitter architectures with multiple encoders. Similarly, a modified de-interleaving function is provided that is suitable for receiver architectures with multiple decoders.

11 Claims, 4 Drawing Sheets

U.S. PATENT DOCUMENTS

| | | |
|---|---|---|
| 2006/0013330 A1 | 1/2006 | Ha |
| 2006/0036924 A1 | 2/2006 | Ghosh |
| 2006/0088114 A1 | 4/2006 | Chen et al. |
| 2006/0088115 A1* | 4/2006 | Chen et al. .............. 375/260 |
| 2006/0093059 A1 | 5/2006 | Skraparlis |
| 2006/0107171 A1 | 5/2006 | Skraparlis |
| 2006/0120469 A1 | 6/2006 | Maltsev et al. |
| 2006/0187815 A1 | 8/2006 | Wallace et al. |
| 2006/0227892 A1 | 10/2006 | Ouyang et al. |
| 2006/0274687 A1 | 12/2006 | Kim |
| 2007/0067696 A1 | 3/2007 | Bhatt et al. |
| 2007/0110178 A1 | 5/2007 | Su et al. |
| 2007/0127587 A1 | 6/2007 | Ouyang et al. |
| 2007/0140100 A1 | 6/2007 | Ouyang et al. |
| 2007/0140364 A1 | 6/2007 | Ouyang et al. |
| 2007/0147521 A1 | 6/2007 | Horng et al. |

OTHER PUBLICATIONS

Naguib, A.; Seshadri, N.; Calderbank, A., "Increasing Data Rate over Wireless Channel", May 2000, Signal Processing Magazine, IEEE, pp. 76-92.*

S.A. Mujtaba, "TGn Sync Proposal Technical Specification," a contribution to doc: IEEE 802.11-04/0889r44, Mar. 2005, pp. 1-164.

C. Kose and B. Edwards, "WWiSE Proposal: High throughput extension to the 802.11 Standard," a contribution to doc: IEEE 802.11-05/0149r2, Mar. 2005, pp 1-93.

U.S. Appl. No. 11/314,925, filed Dec. 20, 2005, X. Ouyang et al.

U.S. Appl. No. 11/253,855, filed Oct. 18, 2005, X. Ouyang et al.

S.A. Mujtaba, "TGn Sync Proposal Technical Specification," doc.: IEEE 802.11-04/889r0, Aug. 2004, pp. 1-135.

M.K. Abdul Aziz and A.R. Nix, "A Study of Perofmance and Complexity for IEEE 802.11n MIMO-OFDM GIS Solutions," IEEE Communications Society, International Conference, New York, 2004, vol. 7, pp. 3822-3826.

S.A. Mujtaba, "TGn Sync Proposal Technical Specification," doc.: IEEE 802.11-04/889r1, Nov. 2004, pp. 1-143.

Singh, et al., "WWiSE Proposal: High throughput extension to the 802.11 Standard," doc.: IEEE 802.11-04/0886r4, Nov. 2004, pp. 1-80.

S.A. Mujtaba, "TGn Sync Proposal Technical Specification," doc.: IEEE 802.11 11-04/889r2, Jan. 2005, pp. 1-152.

International Search Report for International Application No. PCT/KR2006/005555 from Korean Intellectual Property Office dated Mar. 20, 2007, 3 pgs.

Written Opinion of the International Search Authority for International Application No. PCT/KR2006/005555 from Korean Intellectual Property Office dated Mar. 20, 2007, 4 pgs.

International Search Report for International Application No. PCT/KR2006/005133 from Korean Intellectual Property Office dated Feb. 26, 2007, 3 pgs.

Written Opinion of the International Searching Authority for International Application No. PCT/KR2006/005133 from Korean Intellectual Property Office dated Feb. 26, 2007, 3 pgs.

U.S. Final Office Action for U.S. Appl. No. 11/292,851 mailed on Oct. 16, 2008.

U.S. Final Office Action for U.S. Appl. No. 11/292,851 mailed on Mar. 31, 2009.

U.S. Notice of Allowance for U.S. Appl. No. 11/253,855 mailed on Mar. 4, 2008.

U.S. Non-Final Office Action for U.S. Appl. No. 11/104,808 mailed on Jan. 24, 2008.

U.S. Non-Final Office Action for U.S. Appl. No. 11/104,808 mailed on Jul. 21, 2008.

U.S. Final Office Action for U.S. Appl. No. 11/104,808 mailed on Jan. 6, 2009.

U.S. Advisory Action for U.S. Appl. No. 11/104,808 mailed on Apr. 6, 2009.

U.S. Non-Final Office Action for U.S. Appl. No. 11/314,929 mailed on Oct. 10, 2008.

U.S. Final Office Action for U.S. Appl. No. 11/314,929 mailed on Apr. 3, 2009.

U.S. Non-Final Office Action for U.S. Appl. No. 11/314,925 mailed Oct. 15, 2008.

U.S. Final Office Action for U.S. Appl. No. 11/314,925 mailed Apr. 13, 2009.

U.S. Final Office Action for U.S. Appl. No. 11/104,808 mailed on Apr. 6, 2009.

U.S. Final Office Action for U.S. Appl. No. 11/104,808 mailed on Jan. 6, 2009.

U.S. Non-Final Office Action for U.S. Appl. No. 11/104,808 mailed on Jan. 24, 2008.

U.S. Non-Final Office Action for U.S. Appl. No. 11/104,808 mailed on Jul. 21, 2008.

U.S. Office Action for U.S. Appl. No. 11/292,851 mailed on Mar. 31, 2009.

U.S. Office Action for U.S. Appl. No. 11/292,851 mailed on Oct. 16, 2008.

U.S. Office Action for U.S. Appl. No. 11/292,851 mailed on Aug. 20, 2009.

U.S. Office Action for U.S. Appl. No. 11/314,929 mailed on Apr. 3, 2009.

U.S. Office Action for U.S. Appl. No. 11/314,929 mailed on Oct. 10, 2008.

U.S. Notice of Allowance for U.S. Appl. No. 11/253,855 mailed on Mar. 4, 2008.

U.S. Notice of U.S. Appl. 11/253,855 mailed on Mar. 4, 2008.

U.S. Office Action for U.S. Appl. No. 11/314,925 mailed on Apr. 13, 2009.

U.S. Office Action for U.S. Appl. No. 11/314,925 mailed on Oct. 15, 2008.

U.S. Office Action for U.S. Appl. No. 11/314,925 mailed on Sep. 14, 2009.

* cited by examiner

100

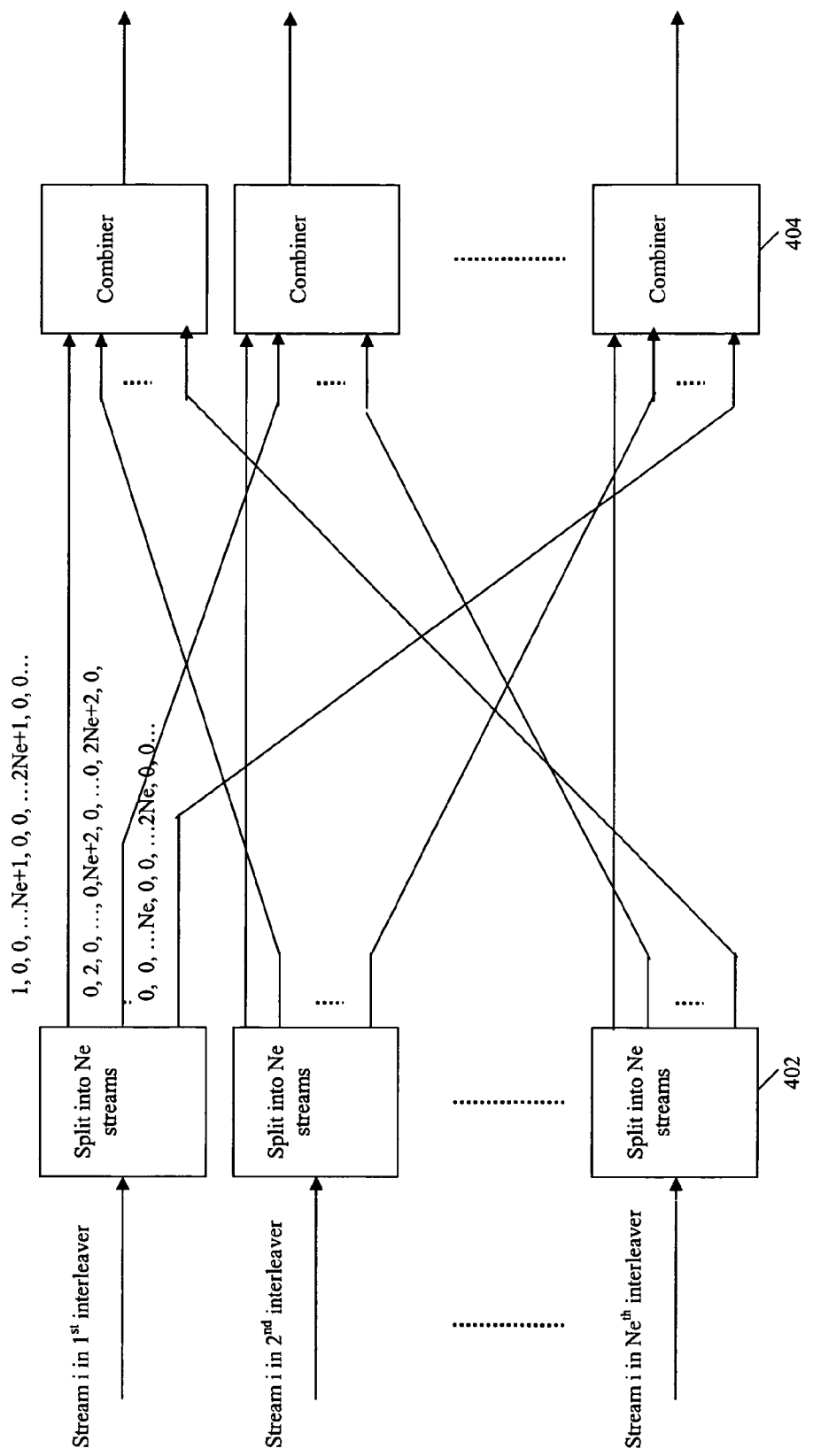

INTERLEAVER DESIGN WITH MULTIPLE ENCODERS FOR MORE THAN TWO TRANSMIT ANTENNAS IN HIGH THROUGHPUT WLAN COMMUNICATION SYSTEMS

FIELD OF THE INVENTION

The present invention relates generally to data communication, and more particularly, to data communication with transmission diversity using Orthogonal Frequency Division Multiplexing (OFDM) in multiple antenna channels.

BACKGROUND OF THE INVENTION

In wireless communication systems, antenna diversity plays an important role in increasing the system link robustness. OFDM is used as a modulation technique for transmitting digital data using radio frequency signals (RF). In OFDM, a radio signal is divided into multiple sub-signals that are transmitted simultaneously at different frequencies to a receiver. Each sub-signal travels within its own unique frequency range (sub-channel), which is modulated by the data. OFDM distributes the data over multiple channels, spaced apart at different frequencies.

OFDM modulation is typically performed using a transform such as Fast Fourier Transform (FFT) process wherein bits of data are encoded by an encoder in the frequency-domain onto sub-channels. As such, in the transmitter, an Inverse FFT (IFFT) is performed on the set of frequency channels to generate a time-domain OFDM symbol for transmission over a communication channel. The IFFT process converts the frequency-domain phase and amplitude data for each sub-channel into a block of time-domain samples which are converted to an analogue modulating signal for an RF modulator. In the receiver, the OFDM signals are processed by performing an FFT process on each symbol to convert the time-domain data into frequency-domain data, and the data is then decoded by a decoder by examining the phase and amplitude of the sub-channels. Therefore, at the receiver the reverse process of the transmitter is implemented. Further, transmit antenna diversity schemes are used to improve the OFDM system reliability. Such transmit diversity schemes in OFDM systems are encoded in the frequency-domain as described.

With the increase in transmission rates, higher operational speeds in the encoder and decoder are resulting in difficulties in implementing such channel encoders/decoders. The transmitter architecture with only one encoder is adopted in current IEEE 802.11n (high throughput WLAN) proposals. FIG. 1 shows one of the examples for such designs implemented in a transmitter 100. The transmitter 100 includes an FEC encoder 102, a puncture unit 104, a spatial stream parser 106, and multiple stream processing paths. Each stream processing path performs the functions of: frequency interleaving 108, QAM mapping 110, antenna mapping 112, IFFT operation 114, inserting guard interval (GI) 116, analog RF modulation 118 and antenna 120. In the transmitter 100, a data stream is first encoded using the FEC encoder before it is split into multiple spatial streams by the spatial stream parser. Multiple interleaving functions with different frequency rotation values are applied after the spatial parsing. As there is only one encoder in the coding chain, there is only one decoder in the decoding chain at a receiver (not shown).

The interleaver design in the high throughput wireless local area network (WLAN) systems is an important issue for MIMO-OFDM transmission. In the current approaches in IEEE 802.11n standards (S. A. Mujtaba, "TGn Sync Proposal Technical Specification," a contribution to IEEE 802.11, 11-04/0889r4, March 2005, and C. Kose and B. Edwards, "WWiSE Proposal: High throughput extension to the 802.11 Standard," a contribution to IEEE 802.11, 11-05-0149r2, March 2005, incorporated herein by reference), the transmitter architecture with single channel encoder is considered regardless of the number of the transmit antennas. When the data rate or the number of the data streams increases, the encoder/decoder must operate with very high speed, causing circuit design and timing implementation difficulties.

BRIEF SUMMARY OF THE INVENTION

According to an embodiment of the present invention a solution to overcoming the aforementioned implementation difficulties for high rate transmissions is to utilize multiple encoders in the transmitter, and thus multiple decoders at the receiver, wherein each encoder operates at lower clock speed than would be necessary with a single encoder. In conjunction with using multiple encoders, a modified interleaving function for each spatial stream processing allows fully exploring the diversity gains. The provided interleaving function is suitable for transmitter architectures with multiple encoders. Similarly, a modified de-interleaving function is provided that is suitable for receiver architectures with multiple decoders.

Accordingly, in one implementation, the present invention provides a method of data communication in a wireless system, comprising the steps of: parsing a bit stream into multiple spatial data streams; encoding the multiple spatial data streams via multiple encoders, wherein each spatial data stream is encoded by a corresponding encoder to generate an encoded stream; interleaving the bits in all encoded streams by performing bit circulation to increase diversity of the wireless system; and transmitting the bits of each spatial data stream.

An additional step includes further parsing each encoded stream into a plurality of encoded spatial data streams, wherein the steps of interleaving further includes the steps of interleaving the bits in all encoded spatial data streams by performing bit circulation to increase diversity of the wireless system.

The present invention further includes a wireless communication system that implements the method of the present invention.

These and other features, aspects and advantages of the present invention will become understood with reference to the following description, appended claims and accompanying figures.

BRIEF DESCRIPTION OF THE DRAWINGS

FIG. 4 shows a functional block diagram of an example implementation of the bit circulation block for a stream in each frequency interleaving output of FIG. 3.

DETAILED DESCRIPTION OF THE INVENTION

According to an embodiment of the present invention a solution to overcoming the aforementioned implementation difficulties for high rate transmissions is to utilize multiple encoders in the transmitter, and thus multiple decoders at the receiver, wherein each encoder operates at lower clock speed. In conjunction with using multiple encoders, the interleaving function for each spatial stream processing path is modified according to the present invention to fully explore the diversity gains. The present invention provides modified interleaving functions suitable for transmitter architectures with multiple encoders. Similarly, the present invention provides modified de-interleaving functions suitable for receiver architectures with multiple decoders.

Figure 2:
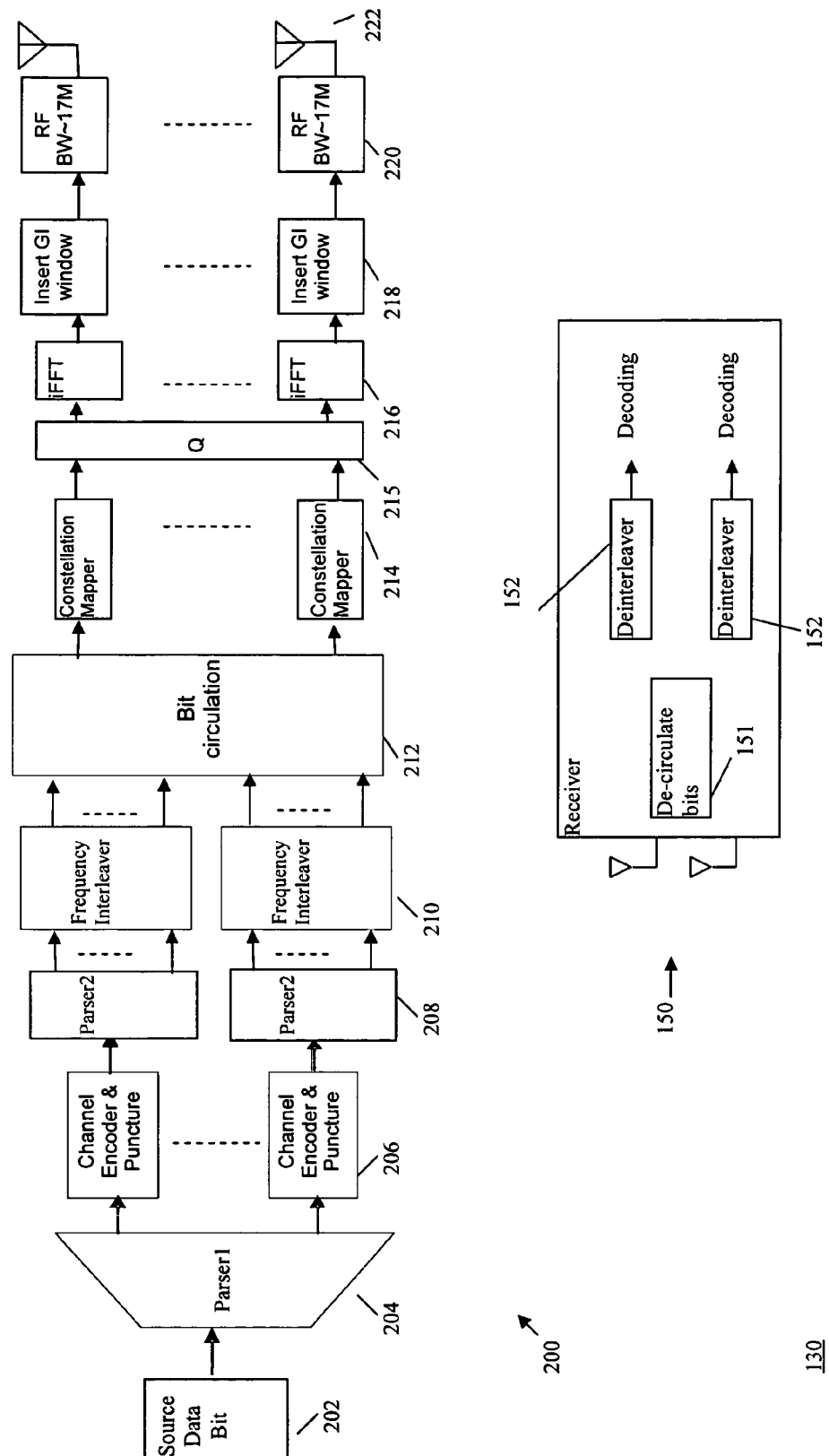
FIG. 2 shows a functional block diagram of a wireless transmitter implementing interleaving architecture according to an embodiment of the present invention.

An implementation of a modified interleaving function according to the present invention includes two stages of operations: frequency interleaving, and bit circulation. FIG. 2 shows a functional block diagram of a communication system 130 including a transmitter 200 and a receiver 150. The transmitter 200 with multiple encoders 204, which implements a modified interleaving function according to an embodiment of the present invention. The transmitter 200 comprises a source of data bit stream 202, a parser 204 (e.g., a Parser1 unit), channel encoders/puncturers 206, parsers 208 (e.g., multiple Parser2 units), frequency interleavers 210, a bit circulation unit 212, constellation mappers 214, antenna mapping Q 215, inverse Fast Fourier Transform (iFFT) units 216, GI insertion units 218, RF modulators 220 and antennas 222. Commonly assigned patent application Ser. No. 11/253,855, filed Oct. 18, 2005, entitled "A method of designing interleavers for multiple-encoder MIMO OFDM systems", provides an example of interleaver for multiple encoders, and commonly assigned patent application Ser. No. 11/314,925, entitled "An Interleaver Design With Column Swap And Bit Circulation For Multiple Convolutional Encoder MIMO OFDM System", provides an example of bit circulation, both of which patent applications are incorporated herein by reference.

The receiver 150 corresponds to the transmitter 200, forming a MIMO system. The receiver 150 includes a bit de-circulation unit 151 that performs the reverse operation of bit circulation unit 212, and deinterleavers 152 that perform the reverse operation of the interleavers 210 in the transmitter 200.

In the transmitter 200, there are $N_{ss}$ data streams, wherein $$N_{ss} = \sum_{i=1}^{N_e} M_i,$$

where $N_e$ is the number of encoders 206 and $M_i$ is the number of output streams for the $i^{th}$ encoder. As shown in FIG. 2, the information bits are first parsed into $N_e$ streams by the parser 204, wherein channel encoding applied to each of the $N_e$ bit streams by a corresponding encoder 204. Each coded and punctured bit stream is then further parsed by a respective parser 208 (there are $N_e$ number of parsers 208, and $M_i$ number of streams are output from each parser 208). The parsed stream from the parsers 208 are then processed in corresponding $M_i$ number of frequency interleavers 210. The outputs of the frequency interleavers 210 are then processed in the bit circulation unit 212.

Figure 3:
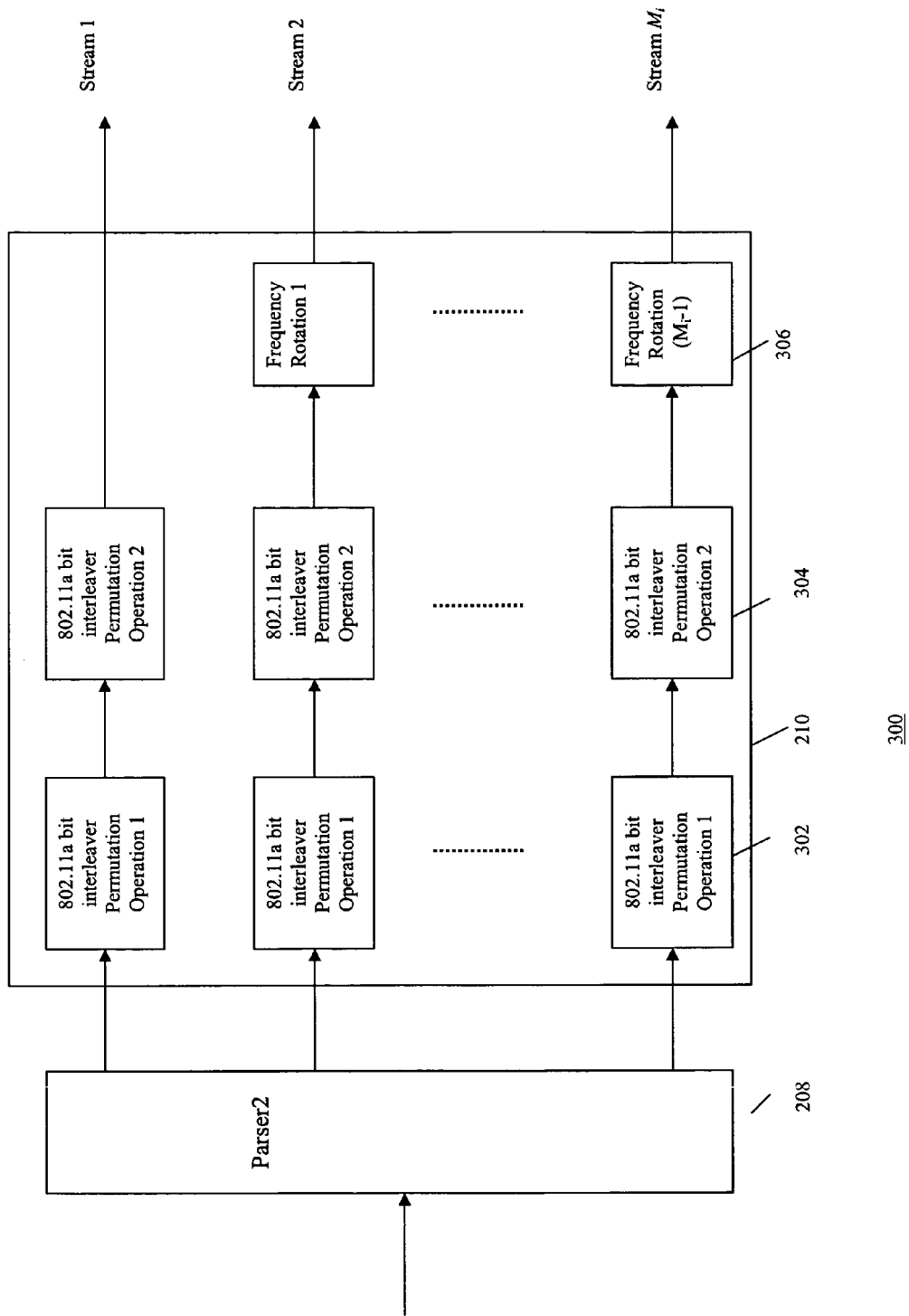
FIG. 3 shows a functional block diagram of an example implementation of the frequency interleaving architecture of FIG. 2 with multiple output streams.

FIG. 3 shows a functional block diagram of an example implementation of the frequency interleaver 210 in conjunction with the parser 208 (e.g., Parser 2). The frequency interleaver 210 comprises first permutation functions 302 and second permutation functions 304. For the $i^{th}$ encoder output, there are $M_i$ output streams after the interleaver operations. The frequency interleaver 210 further includes frequency rotation units 306.

Figure 1:
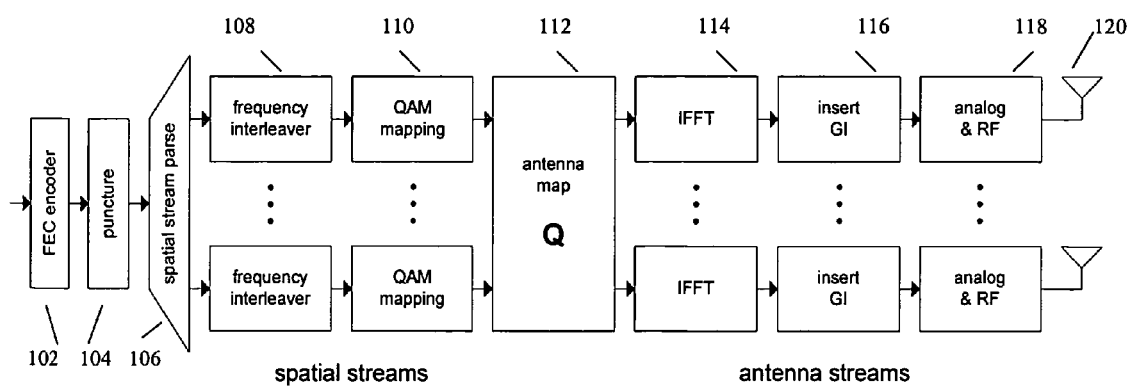
FIG. 1 shows a block diagram of a conventional wireless transmitter architecture with a single encoder.

Three stages of operations are involved with interleaver operation: (1) first permutation operations by first permutation functions 302, (2) second permutation operations by second permutation functions 304, and (3) frequency rotations by frequency rotation units 306. In order to fully explore the diversity gains when multiple encoders (e.g., encoders 206, FIG. 1) are present, bit circulation operation is followed after the interleaving functions.

For each spatial stream processed within the interleaver 210, the first two stages of interleaving (i.e., first and second permutation operations) are identical among the different spatial streams, which in this example are the same as in a conventional IEEE 802.11a interleaving. Alternatively, instead of the IEEE 802.11a interleaving, other interleaving examples are possible and anticipated by the present invention.

However, for the third operation (i.e., frequency rotations), the amount of frequency rotation by the frequency rotation units 306 varies among the spatial streams. In general, the frequency rotation amount can be a variable in each spatial stream, although fixed rotation amount may also be used.

The bit circulation operations can be an extension of an interleaver design in said commonly assigned patent application Ser. No. 11/253,855, filed Oct. 18, 2005, entitled "A method of designing interleavers for multiple-encoder MIMO OFDM systems" (incorporated herein by reference). An example implementation of the bit circulation according to the present invention is described below.

FIG. 4 shows example bit circulation architecture 400 for multiple encoders, comprising two stages of operations: splitting units 402, and combining unit 404. For example, the $i^{th}$ output stream from each encoder is first split into $N_e$ sub-streams by splitting units 402 in bit-by-bit fashion, and the $j^{th}$ sub-streams from all splitting units 402 are then combined by the combining units 404 to form the $j^{th}$ (out of the $N_e$) output stream of the bit circulation function 400.

Alternative frequency rotations may be used for frequency interleaver design (an example frequency rotation is described in S. A. Mujtaba, "TGn Sync Proposal Technical Specification," a contribution to IEEE 802.11, 11-04/0889r4, March 2005, incorporated herein by reference). Other bit circulation rules can also be applied. Although a certain bit may end up in an antenna different from its original one before bit circulation, similar system performance can be obtained as long as a certain bit is on the same position of the data groups before a splitting unit 402 and after a combining unit 404.

As such, the bit circulator 400 for each processing path comprises a splitter 402 and a combiner 404. In the example shown in FIG. 4, it is assumed that $M_i$ are equal for all i= 1, . . . , $N_e$. The splitter 402 splits the output bits of the corresponding frequency interleaver 210 into $N_e$ sub-streams. The combiner 404 combines the bits from the corresponding frequency interleaver 210 in each encoder to form a new bit sequence for transmission. For example, as shown in FIG. 4, output of first combiner 404 for ith stream is the first output of the splitter in stream i of encoder 1 combined with the second output of the splitter in stream i of encoder 2, and so on.

In case of non-equal Mi, the splitter can split the output bits of the corresponding frequency interleaver into $N_{ss}$ groups. The combiner combines the bits from the corresponding frequency interleaver in each encoder to form a new bit sequence for transmission, in a similar manner as the step described above.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of data communication in a wireless system, comprising:
    employing a first parser for parsing a bit stream into multiple spatial data streams;
    encoding the multiple spatial data stream via multiple decoders, wherein each spatial data stream is encoded by a corresponding separate decoder to generate multiple separately encoded spatial data streams;
    employing multiple second parsers, each second parser for further parsing each of a corresponding one of the multiple separately encoded spatial data streams into a further plurality of encoded spatial data streams;
    interleaving the bits in all of the plurality of further parsed encoded spatial data streams;
    performing bit circulation to increase diversity of the wireless system before constellation mapping, wherein performing bit circulation further comprising:
        splitting the bits in each encoded spatial data stream into multiple groups corresponding to subcarriers in a transmission symbol,
        circulating the bits among the groups, and
        combining the bits from the different encoded spatial data streams to form a new bit sequence for transmission;
    transmitting the bits of each of the plurality of further parsed encoded spatial data stream.

2. The method of claim 1 wherein interleaving the bits in each spatial data stream further includes performing bit permutation and frequency rotation.

3. The method of claim 1 wherein interleaving the bits in each encoded spatial data stream includes, before bit circulation, performing a first interleaving permutation.

4. The method of claim 3 further including performing a second interleaving operation.

5. The method of claim 1 wherein the wireless system comprises an Orthogonal Frequency Division Multiplexing (OFDM) multiple input and multiple output (MIMO) system.

6. A wireless communication system, comprising:
    a transmitter including:
        a first parser for parsing a bit stream into multiple spatial data streams;
        an encoder for encoding the multiple spatial data streams via multiple encoders, wherein each spatial data stream is encoded by a corresponding separate encoder to generate a multiple separately encoded spatial data streams;
        multiple second parsers for further parsing each of a corresponding one of the multiple separately encoded spatial data streams into a further plurality of encoded spatial data streams;
        interleaver block including a plurality of interleavers for interleaving the bits in all of the plurality of further parsed encoded spatial data streams;
        a bit circulation unit performing bit circulation to increase diversity of the wireless system before constellation mapping, wherein the bit circulation unit further comprising:
            splitting unit splitting the bits in each encoded spatial data stream into multiple groups corresponding to subcarriers in a transmission symbol and circulating the bits among the groups, and
            combining unit combining the bits from the different encoded spatial data streams to form a new bit sequence for transmission;
        wherein the transmitter transmitting the bits of each of the plurality of further parsed encoded spatial data streams.

7. The system of claim 6 wherein the interleaver further interleaves the bits in each encoded spatial data stream by performing bit permutation and frequency rotation.

8. The system of claim 6 wherein interleaver interleaves the bits in each encoded spatial data stream by further, before bit circulation, performing a first interleaving permutation.

9. The system of claim 8 wherein the transmitter further performs a second interleaving operation before transmission.

10. The system of claim 6 wherein the wireless system comprises an Orthogonal Frequency Division Multiplexing (OFDM) multiple input and multiple output (MIMO) system.

11. The method of claim 2, wherein the amount of frequency rotation varies among all of further parsed encoded spatial data streams.

* * * * *